United States Patent
Hernandez (10) Patent No.: US 12,473,095 B2
(45) Date of Patent: Nov. 18, 2025

(54) HIGH VISIBILITY HOOK LATCH

(71) Applicant: Andres Hernandez, Yorba Linda, CA (US)

(72) Inventor: Andres Hernandez, Yorba Linda, CA (US)

(*) Notice: Subject to any disclaimer, the term of this patent is extended or adjusted under 35 U.S.C. 154(b) by 0 days.

(21) Appl. No.: 17/180,729

(22) Filed: Feb. 20, 2021

(65) Prior Publication Data

US 2022/0267018 A1     Aug. 25, 2022

(51) Int. Cl.
| | | |
|---|---|---|
| *E05B 41/00* | (2006.01) | |
| *B64D 29/06* | (2006.01) | |
| *B64D 29/08* | (2006.01) | |
| *E05C 19/14* | (2006.01) | |
| *E05B 63/00* | (2006.01) | |
| *E05C 19/12* | (2006.01) | |

(52) U.S. Cl.
CPC .............. *B64D 29/06* (2013.01); *B64D 29/08* (2013.01); *E05B 41/00* (2013.01); *E05C 19/145* (2013.01); *E05B 63/0056* (2013.01); *E05C 19/12* (2013.01); *E05Y 2900/502* (2013.01); *Y10T 292/0949* (2015.04)

(58) Field of Classification Search
CPC ........ B64D 29/06; B64D 29/08; B64D 29/00; B64D 29/02; B64D 29/04; B64D 9/00; E05B 41/00; E05B 13/002; E05B 63/0056; E05C 19/145; E05C 19/10; E05C 19/12; E05C 19/14; E05Y 2900/502; B64C 1/14; B64C 1/143; B64C 1/1469; B64C 7/02; B64C 1/1446; B64C 1/1407; Y10T 292/0886; Y10T 292/089; Y10T 292/0911; Y10T 292/0913; Y10T 292/0917; Y10T 292/0949; Y10T 292/216; Y10S 292/31; Y10S 292/49; Y10S 292/60

See application file for complete search history.

(56) References Cited

U.S. PATENT DOCUMENTS

| | | | |
|---|---|---|---|
| 1,382,322 A | 6/1921 | Schleicher | |
| 2,703,431 A * | 3/1955 | Tatom ................... | E05C 19/145 |
| | | | 292/DIG. 31 |
| 2,712,955 A | 7/1955 | Andrews | |
| 2,904,141 A | 9/1959 | Henrichs | |
| 2,927,812 A * | 3/1960 | Smith ..................... | E05C 3/122 |
| | | | 292/DIG. 31 |
| 3,259,411 A | 7/1966 | Griffiths | |
| 3,259,412 A | 7/1966 | Frank | |
| 3,318,624 A | 5/1967 | Richard et al. | |
| 4,053,177 A | 10/1977 | Stammreich et al. | |
| 4,116,479 A | 9/1978 | Poe | |
| 4,183,564 A | 1/1980 | Poe | |
| 4,220,364 A * | 9/1980 | Poe ........................ | E05B 15/025 |
| | | | 292/113 |

(Continued)

FOREIGN PATENT DOCUMENTS

WO    WO-2016040501 A1 *   3/2016  .......... E05B 13/002

*Primary Examiner* — Carlos Lugo
(74) *Attorney, Agent, or Firm* — Knobbe, Martens, Olson & Bear, LLP (57) ABSTRACT

A high visibility hook latch may include a hook arm having a proximal end and a distal end; a handle pivotably attached to the proximal end of the hook arm; and a connector having a first connector end pivotably attached to the distal end of the hook arm via a link and a second connector end pivotably attached to the handle proximate to the hook arm.

18 Claims, 7 Drawing Sheets

(56) References Cited

U.S. PATENT DOCUMENTS

| | | | |
|---|---|---|---|
| 4,318,557 A | 3/1982 | Bourne et al. | |
| 4,530,529 A | 7/1985 | Poe et al. | |
| 4,602,812 A | 7/1986 | Bourne | |
| 4,759,574 A | 7/1988 | James | |
| 4,858,970 A * | 8/1989 | Tedesco | E05C 19/145 |
| | | | 292/DIG. 31 |
| 5,152,559 A | 10/1992 | Henrichs | |
| 5,620,212 A * | 4/1997 | Bourne | E05C 19/145 |
| | | | 292/DIG. 31 |
| 5,788,406 A | 8/1998 | Hernandez | |
| 5,984,382 A * | 11/1999 | Bourne | E05C 19/145 |
| | | | 292/DIG. 31 |
| 6,279,971 B1 | 8/2001 | Dessenberger, Jr. | |
| 6,325,428 B1 | 12/2001 | Do | |
| 6,866,226 B2 | 3/2005 | Pratt et al. | |
| 7,578,475 B2 | 8/2009 | Pratt et al. | |
| 8,186,728 B2 * | 5/2012 | Kopylov | E05C 19/14 |
| | | | 292/113 |
| 8,925,979 B2 | 1/2015 | Hernandez et al. | |
| 9,663,216 B2 | 5/2017 | Hernandez | |
| 10,173,782 B2 | 1/2019 | Hernandez | |
| 10,352,074 B2 | 7/2019 | Hernandez | |
| 10,808,422 B2 | 10/2020 | Hernandez | |
| 2008/0129056 A1 * | 6/2008 | Hernandez | E05C 19/14 |
| | | | 292/121 |
| 2009/0173823 A1 * | 7/2009 | Shetzer | B64D 29/06 |
| | | | 244/129.4 |
| 2015/0259957 A1 * | 9/2015 | Hernandez | E05C 19/145 |
| | | | 292/97 |
| 2015/0300061 A1 * | 10/2015 | Fabre | F02C 7/20 |
| | | | 292/113 |
| 2016/0060916 A1 | 3/2016 | Hernandez | |
| 2016/0264250 A1 | 9/2016 | Hernandez | |
| 2016/0280383 A1 * | 9/2016 | Lee | B64D 29/08 |
| 2017/0211607 A1 | 7/2017 | Hernandez | |
| 2017/0226781 A1 | 8/2017 | Hernandez | |
| 2017/0260782 A1 * | 9/2017 | Kim | E05B 13/002 |
| 2018/0128028 A1 * | 5/2018 | Hernandez | E05B 53/00 |
| 2018/0245634 A1 | 8/2018 | Hernandez | |
| 2018/0328397 A1 | 11/2018 | Hernandez | |
| 2022/0120115 A1 * | 4/2022 | Helsley | E05B 63/06 |
| 2022/0267018 A1 | 8/2022 | Hernandez | |

* cited by examiner

HIGH VISIBILITY HOOK LATCH

BACKGROUND

Field of the Invention

The invention relates to latches; and more particularly, to aircraft latches.

Related Art

Latches are used on the exterior surfaces of aircraft where it is important that the latch present a flush surface with the aircraft body and indicate when the latch is in a locked or unlocked position.

Such latches normally cooperate with a keeper or locking pin on an opposing surface for engaging the latch. It is important that such latches be securely and tightly latched especially when subjected to high vibrations and rattling.

The trigger of such latches is normally exposed and unprotected. It can be hit accidentally during maintenance or the like thus unlocking the latch when such is undesirable. Further, such latches must be securely latched in a positive manner. Unless some provision is made to positively lock the latch, the aircraft cowl may come down and close in a situation where the latch has not been completely locked. Finally, it is difficult to visually observe many of these latches to ensure that they are shut.

There is a need for a latch that cannot be opened accidentally during service or the like and are visually easy to determine if they are shut. Such a latch should have such a safety feature with anti-vibrating means and means for mounting the same to a preexisting housing which can be modified to accommodate the latch. The operator should not be able to close the aircraft cowl in which the latch is associated unless the latches fully latched.

Aircraft nacelle latches have historically been difficult to see, especially when they are disengaged. If an aircraft is dispatched with disengaged latches, there is a potential for inflight accidents. Many attempts to solve this are at play, resulting in heavy and sometimes complex devices.

Therefore, what is needed is an aircraft nacelle latch that has increased visibility while simultaneously being lighter and more cost efficient than conventional devices.

SUMMARY OF THE INVENTION

Some embodiments of the present disclosure include a high visibility hook latch for engagement with, for example, a mating clevis on an aircraft nacelle. The hook latch may include a hook arm having a proximal end and a distal end; a handle pivotably attached to the proximal end of the hook arm; and a connector having a first connector end pivotably attached to the distal end of the hook arm via a link and a second connector end pivotably attached to the handle proximate to the hook arm.

It is an object of this invention to provide an aircraft latch which cannot be opened accidentally during service or the like.

It is another object of this invention to provide a latch which can be easily mounted to a preexisting aircraft housing in a rigid manner.

It is still another object of this invention to provide a spring braced trigger lock with anti-vibrating means.

It is a further object to provide a detent in the latch that engages with the preexisting housing to hold the latch handle in place when the latch is fully open.

Finally, it is the main object to provide such a latch that can be visually inspected to be shut or open easily.

BRIEF DESCRIPTION OF THE DRAWINGS

Having thus described the invention in general terms, reference is now made to the accompanying figures, which show different views of different example embodiments.

DETAILED DESCRIPTION OF DRAWINGS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a high visibility hook latch for an aircraft nacelle and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the device of the present invention may be related in the following exemplary fashion. It is not intended to limit the scope or nature of the relationships between the various elements and the following examples are presented as illustrative examples only.

By way of example, and referring to the Figures, some embodiments of the invention include a high visibility hook latch for aircraft nacelles, the high visibility hook latch 20 comprising a hook arm 2 having a proximal end and a distal end, a handle 4 pivotably attached to the proximal end of the hook arm 2, and a connector 3 having a first connector end pivotably attached to the distal end of the hook arm 2 via a link 1 and a second connector end pivotably attached to the handle 4 proximate to the hook arm 2 via a pin assembly 11. In some embodiments, the pin assembly 11 comprises a female press pin and male press pin. As shown in the Figures, the hook arm 2 may include a main hook 21 extending from the proximal end thereof, wherein the main hook 21 is designed to engage with the respective mating structure 30, such as a mating clevis on the aircraft nacelle.

Figure 1:
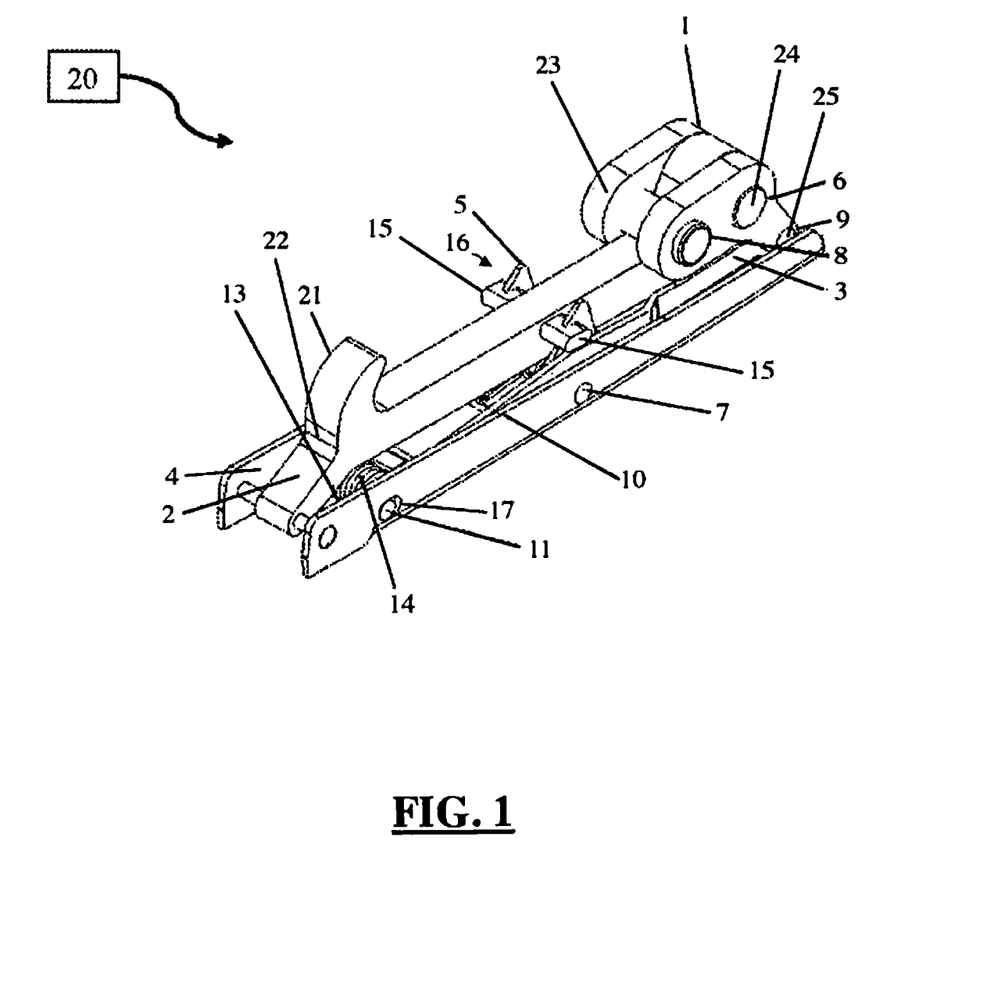
FIG. 1 shows a perspective view of the device.
Figure 2:
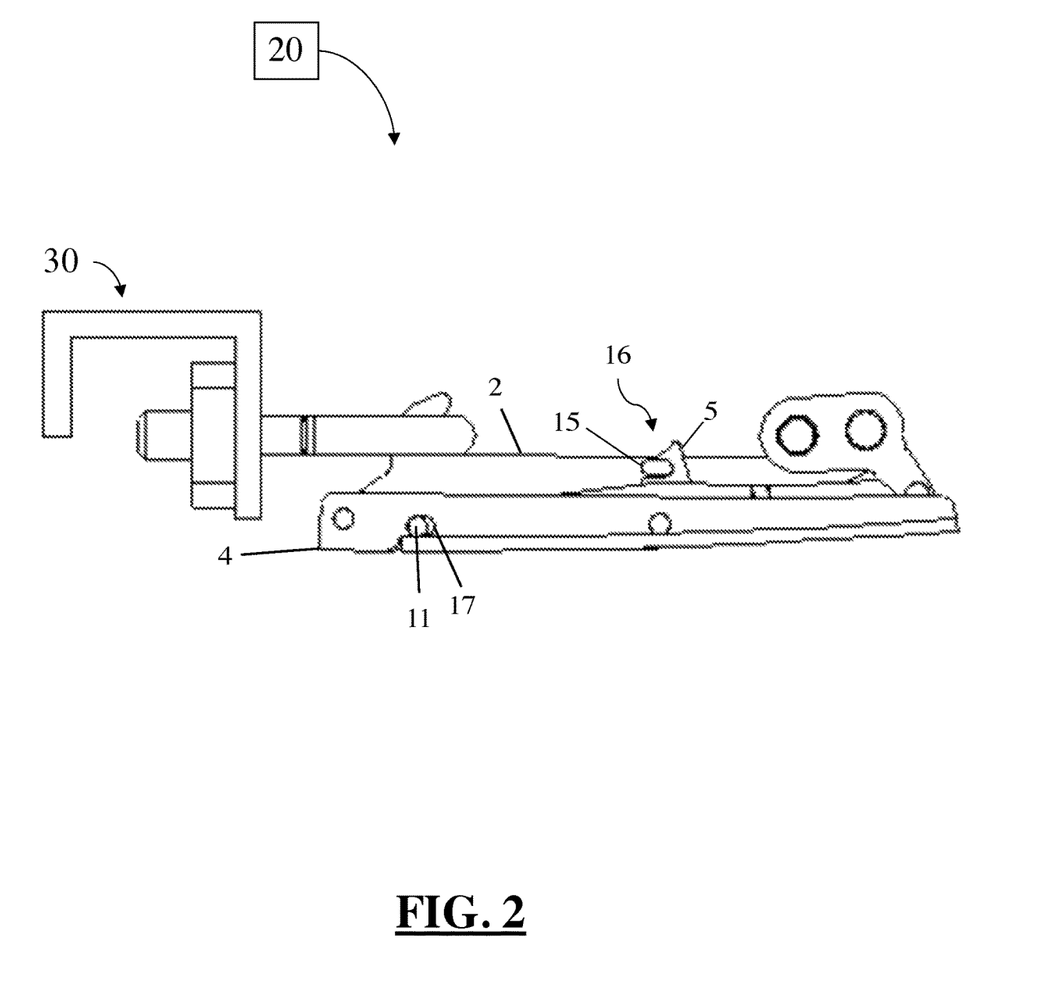
FIG. 2 shows a side view of the device.
Figure 3:
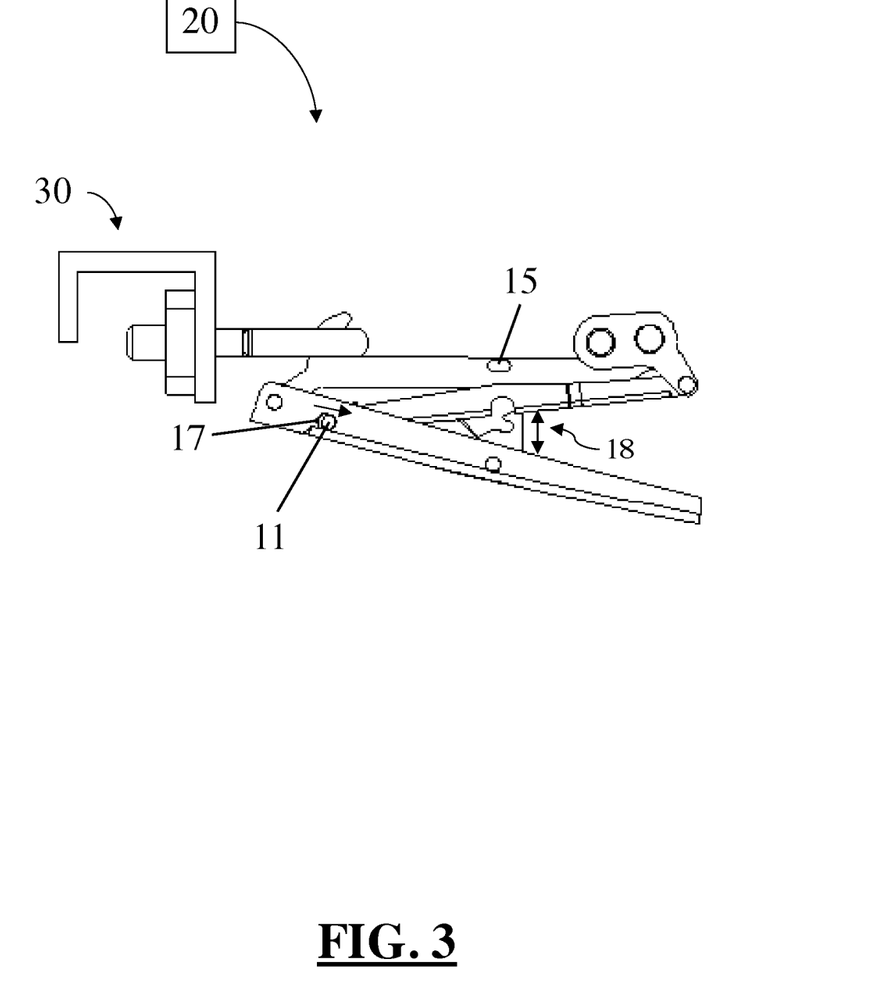
FIG. 3 shows a side view of the device in the free travel position.
Figure 4:
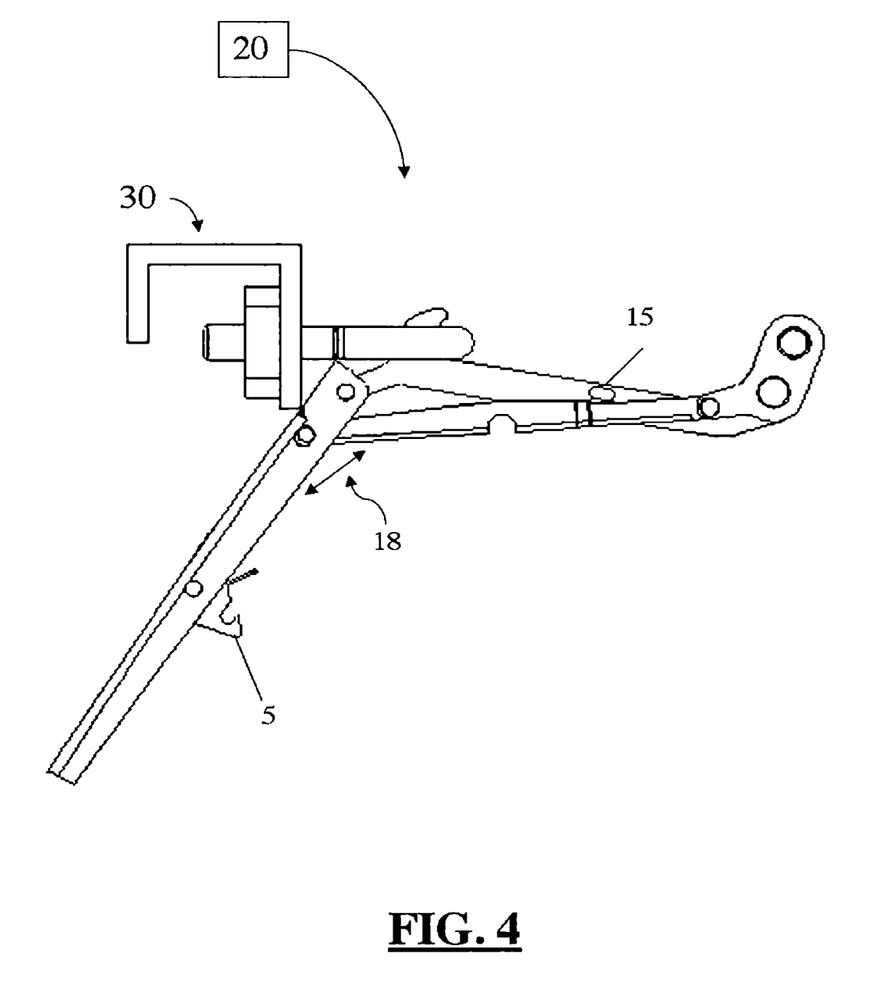
FIG. 4 shows side view of the device in the open position.
Figure 5:
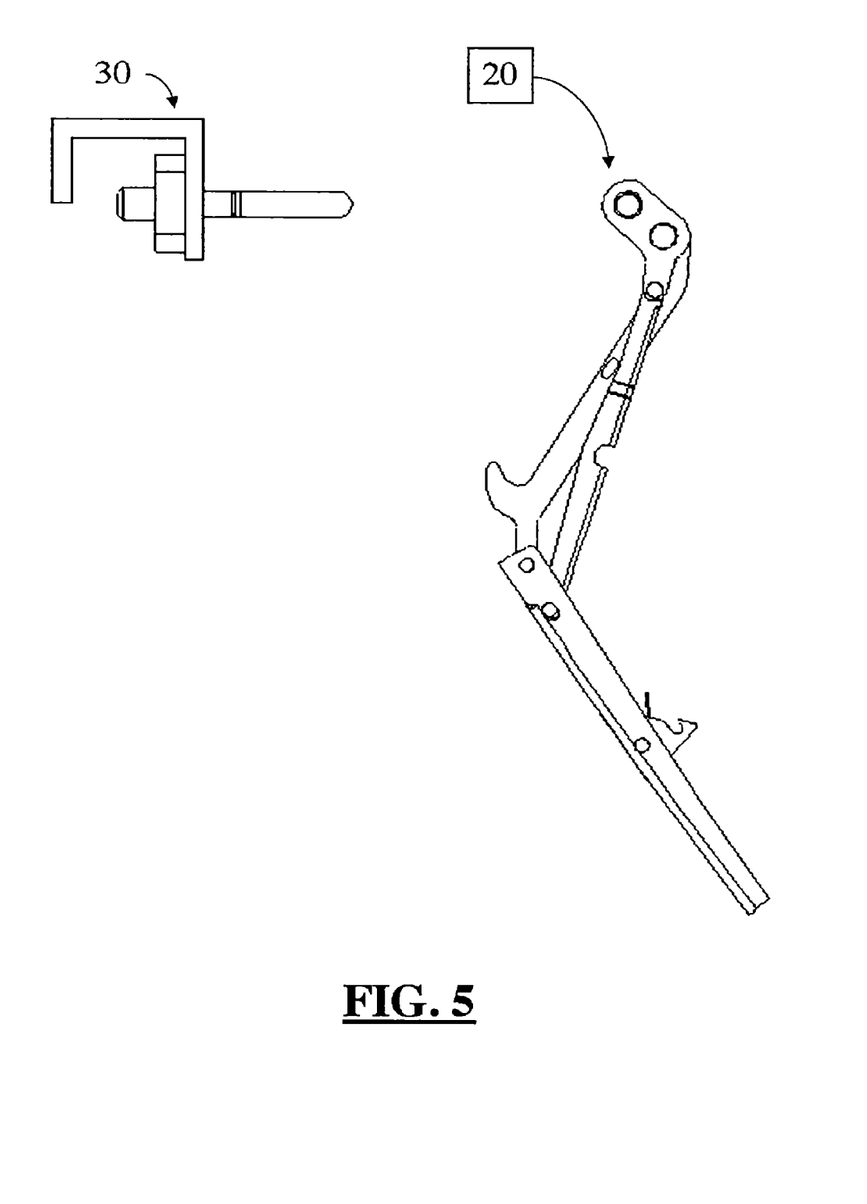
FIG. 5 shows a side view of the device disengaged from a mating clevis.

With continued reference to the Figures, the high visibility latch 20 has three positioning configurations. FIG. 2 shows the latch 20 in a closed position configuration. FIG. 3 shows the latch 20 in a free travel position configuration. FIG. 4 shows the latch 20 in an open position configuration.

As also shown in the Figures, the link 1 may be a substantially rounded L-shaped component, wherein the length of the link 1 provides the reach or take up that the latch 20 will be able to accommodate. The link 1 may have three connections: a first end is connected to a mounting bushing 8, a mid-point pivot axis is connected to the hook arm 2, and a far axis is connected to the connector 3 via a second rivet 9, wherein the connector 3 is also connected via a sliding axis to the handle 4. The bushing 8 may connect and pivot around a structure mounting pin 6, wherein the link 1 is secured to the bushing 8 on one end and the other end may be connected to the hook 2 via a pin 6. The connector 3 may drive the rotational movement of the link 1. The handle 4 is designed to pivot around the hook arm 2 via a first rivet 7.

The hook latch 20 may also comprise a trigger 5 extending from the handle 4. The trigger 5 may be spring closed via a trigger spring 10 and may engage with the hook arm 2 with a securing feature built into the hook arm. As such, once the trigger 5 is pushed and disengaged, the hook arm 2 may spring open via the connector spring 14. In some embodiments, the hook arm 2 may have an adjustable length to accommodate different device lengths, wherein the length of the hook arm may be adjusted via a hook arm adjustment means 22.

The link may be designed to be locked in position against a mounting pin 6 via the bushing 8 when the latch 20 is in the closed configuration. While in the closed configuration, the hook arm 2 is axially loaded from the proximal end via the hook that engages with the mating clevis. In this closed position, the hook latch 20 can be loaded to its mechanical properties level.

With the hook still axially loaded, the trigger 5 may be pushed open, allowing the handle 4 to rotate open a few degrees (such as about 10 degrees), which may be controlled by a slot 17 in the handle 4 that limits the sliding of the connector 3. This places the latch 20 into its free travel configuration, making it ready to be completely opened.

To place the latch 20 in its open configuration, the handle 4 may be grabbed and pulled, overcoming the over-center lock that the device was in and ultimately allowing the hook arm 2 to unravel around the bushing 8 via the link 1, which in turn is rotating open around the bushing 8. Once this movement is completed, the handle 4 is fully extending open and the latch 20 is disengaged.

With continued reference to the Figures, a high visibility hook latch device is shown. The latch device 20 may comprise a hook arm 2 having a proximal end and a distal end, a handle 4 pivotably attached to the proximal end of the hook arm 2, and a connector 3 having a first connector end pivotably attached to the distal end of the hook arm via a link and a second connector end pivotably attached to the handle 4 proximate to the hook arm 2.

Further, in some embodiments, the latch 20 may comprise a handle 4, adjustment means for adjusting an angle of inclination 18 of the handle 4 in a closed position of the latch 20, wherein said means may be controllable on the handle 4. Further, the latch 20 may comprise a safety device 16 suitable for preventing the latch 20 being operated by means of the handle 4 and presenting a dimension 18 that is adjustable. Further, in some embodiments, the means for adjusting the angle of inclination 18 comprises the safety device 16. Further, the adjustment means 16 are operable when the latch 20 is in the closed position. Further, the latch 20 may comprise a main hook 21 configurable to attach to a mating clevis 30. Further, the safety device 16 may comprise a safety hook 5 extending from the handle 4, the safety hook 5 configured to engage a rod 15 extending from the hook arm 2 when the latch 20 is in a closed position, and enable the position of the of the safety hook 5 relative to the rod 15 to be adjusted.

Figure 2B:
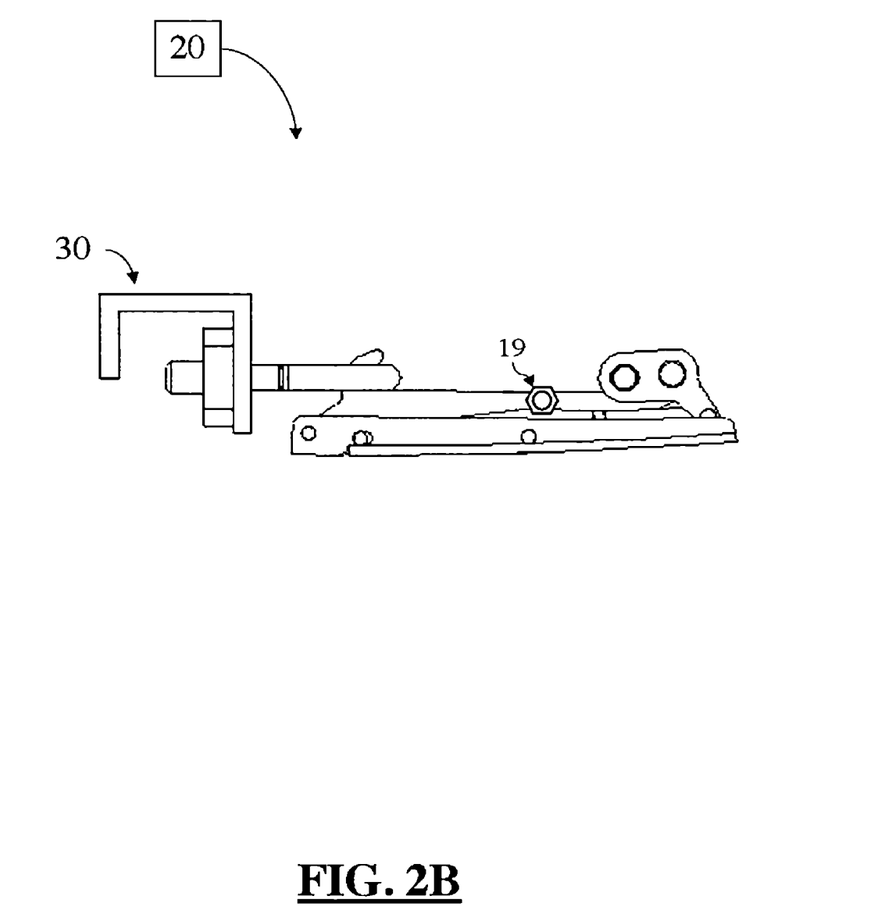
FIG. 2B shows a side view of another embodiment the device including a faster means comprising a screw-and-nut connection.

In one embodiment, the high visibility hook latch 20 may comprise a hook arm 2 having a proximal end and a distal end, a handle 4 pivotably attached to the proximal end of the hook arm 2 and a connector 3 having a first connector end pivotably attached to the distal end of the hook arm 2 via a link 1 and a second connector end pivotably attached to the handle 4 proximate to where the hook arm 2 is attached to the handle 4. Further, in said embodiment, the link 1 may have a first end attachment point 23, a mid-point pivot axis point 24 pivotably attached to the distal end of the hook arm 2, and a far axis pivot point 25 pivotably attached to the first connector end of the connector 3. Further, in said embodiment, the wherein the handle 4 may be configured to pivot around the hook arm 2. Further, in said embodiment, the connector 3 may be configured to drive the rotational movement of the link 1. Further, in said embodiment, the latch 20 may further comprise an adjustment means for creating a gap 18 between the handle 4 and the connector 3, wherein the gap 18 may be suitable for configuring the latch 20 into the open position from the closed position by means of the handle 4. Further, in said embodiment, the latch 20 may further comprise a safety device 16, wherein the safety is suitable for preventing the latch 20 being operated by means of the handle 4 in the closed position. Further, in said embodiment, the adjustment means includes the safety device 16 and the adjustment means may be actuated in the following manner: when the safety hook 5 is disengaged from the rod 15, the latch 20 opens and the gap 18 is created. Once the gap 18 has been created, the latch 20 may be configured into the open position from the closed position. In some other embodiments, the safety device 16 may be replaced by a screw-and-nut connection 19.

While the terms "safety hook" and "trigger" are used in the present disclosure, it is contemplated that said terms "safety hook", "trigger" and may be used interchangeably and are both understood to refer to the same element 5.

While the terms "angle of inclination" and "gap" are used in the present disclosure, it is contemplated that said terms "angle of inclination" and "gap" may be used interchangeably and both refer to the same element 18. Accordingly, said terms refer to a dimension that is adjustable that allows the latch 20 to be configured from the closed position to the open position. The angle of inclination is relative to the size of the components, wherein the larger the components, the smaller an angle of inclination is necessary to produce a gap suitable for configuring the latch into the open position from the closed position.

Figure 6:
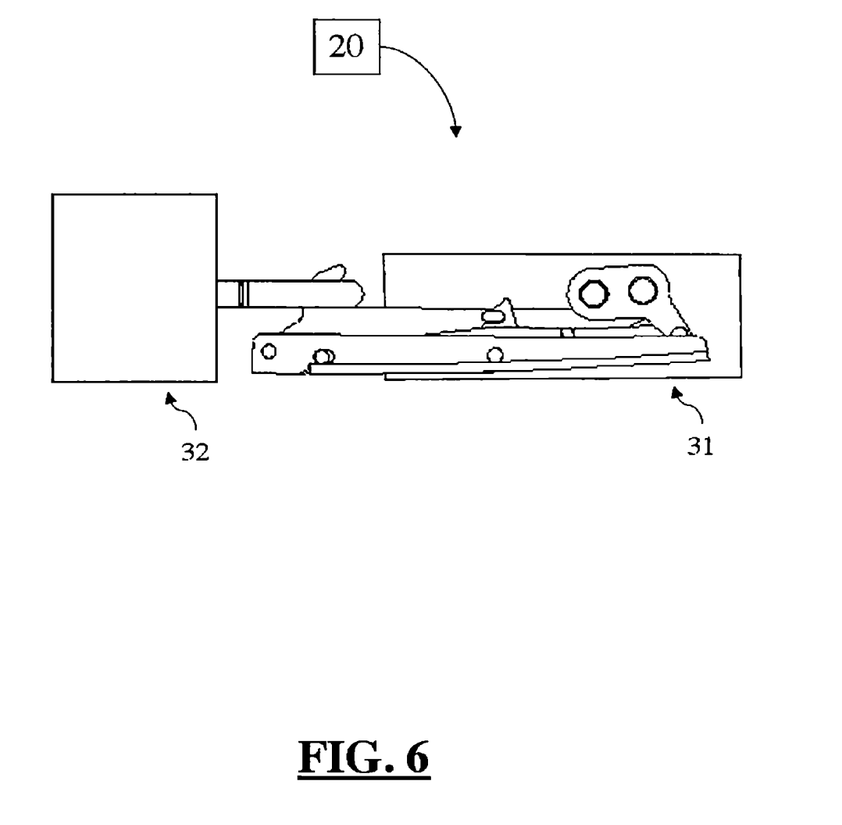
FIG. 6 a side view of an exemplary embodiment of an assembly including the device securing a base to a door.

With reference to FIG. 6, an assembly is shown. The assembly comprises a base 31, a door 32 and a latch device 20 suitable for holding the door 32 in the closed position relative to the base 31. With continued reference to the figures, the device 20 may comprise a handle 4, and adjustment means 11 for adjusting an angle of inclination 18 of the handle 4 in a closed position of the latch, the adjustment means being controllable from outside the door, and a safety device 16 suitable for preventing the latch being operated by means of the handle 4 and presenting an adjustable dimension. Further, the adjustment means are controllable while the door 32 is in the closed position. Further, the latch 20 can be visually determined to be open or closed. While the terms "latch", "latch device", and "device" are used in the present disclosure, it is contemplated that said terms "latch", "latch device" and "device" may be used interchangeably and are both understood to refer to the same element 20.

Due to the structure of the high visibility hook latch 20 of the present disclosure, the visible length thereof is almost double one it is in the open configuration. The increased visibility is achieved with fewer parts and in a simpler fashion as compared to currently existing devices.

There are numerous door members in aircraft that are held by a latch in a predetermined position, e.g. a closed position. These members, referred to herein as "doors" may be constituted, for example, by covers, hatches, or indeed radomes. The latch includes a main hook 21 suitable for engaging an attachment point that is fastened to a base 31. It also includes a lever handle 4 for operating the hook 21, which lever handle 4 is generally accessible through an opening in the door 32, the lever handle 4 being hinged both to the door 32 and also to the hook arm 2.

The outside face of the lever handle is thus visible and accessible through the opening in the door. This face is usually of a plane shape that is designed to extend flush with the face of the door. Nevertheless, it can happen that when the latch is in the closed position, the outside face of the lever handle does not extend the outside face of the door, which is generally undesirable for reasons of aerodynamic drag or of appearance. This can be remedied by adjusting the position of the attachment point of the hook. The angle of inclination of the lever handle in the closed position of the latch depends in particular on the position of the hook on the attachment point. Nevertheless, such an adjustment is difficult to perform: it is necessary to open the door in order to access the attachment point, then to adjust it, then adjust the length of the hook itself by means of a member provided for this purpose on the hook. The distance between the attachment point and the hinge between the hook and the handle has an influence on the force that the operator needs to exert on the handle when closing the latch. Once these operations have been performed, the door is reclosed and examined to see whether the handle has an appropriate angle of inclination, if it does not, then these operations need to be restarted. As a general rule, these operations will be performed several times, thus making the procedure iterative. In addition, the same operations need to be repeated as many times as there are latches to adjust.

In an embodiment of the present invention, a latching system is provided for selectively securing a first cowl door with a second cowl door. The latching system includes an anchor secured to the first cowl door and a latch secured to the second cowl door. The latch includes a handle moveable from a closed position to an open position. The latch further includes a gripping arm having a first end configured to couple to the anchor in order to secure the latch to the anchor. The handle is only moveable to the closed position only when the gripping arm of the latch is secured to the anchor.

It is contemplated that the latching system also includes a biasing element for biasing the gripping arm. In some embodiments the biasing element biases the gripping arm to a position in which the gripping arm of the latch is unsecured to the anchor. It is also contemplated that the handle is further only movable to the closed position when additionally, a force exerted by the biasing element is overcome. The biasing element may also be configured to preclude the handle from moving to the closed position unless the latch is secured to the anchor.

It is further contemplated that the latching system also includes a frame having a first aperture, a first end, and a second end. The first end of the frame is preferably pivotably connected to a first end of the handle. The second end of the frame slidably receives the gripping arm of the latch.

The latching system may also include an actuating member disposed in the handle. The actuating member includes a post configured to extend though the first aperture of the frame. More specifically, the post only extends through the first aperture of the frame while the handle is being moved to the closed position if the gripping arm of the latch is secured to the anchor. It is contemplated that the post of the actuating member includes a head which is configured to selectively lock the handle in the closed position.

It is also contemplated that the latching system further includes a bracket secured to a second end of the gripping arm of the latch. The bracket includes a second aperture. In such a case, the post may only extend through the first aperture of the frame and the second aperture of the bracket if they are aligned while the handle is being moved to the closed position if the gripping arm of the latch is secured to the anchor.

It is further contemplated that the first aperture of the frame and the second aperture of the bracket are biased to be misaligned. Therefore, the latching system may include a biasing element. The biasing element may be at least one conical spring washer, a compression spring, a compressed gas piston, an elastomer part, a hydraulic piston, or any other similar biasing element. The latching system may also include a tube disposed within the frame. The tube has a closed end and an open end. The closed end of the tube may be secured to the bracket. The open end of the tube may contain a housing that is movable relative to the tube. The housing may also be secured to the second end of the frame.

Furthermore, the gripping arm of the latch may also include a flange disposed between the first end of the gripping arm and the second end of the gripping arm. The flange of the gripping arm of the latch may be disposed within the housing.

It is contemplated that the biasing element is disposed within the tube between the closed end of the tube and the housing. The biasing element may bias the first aperture of the frame and the second aperture of the bracket into misalignment.

In one or more embodiments, the anchor of the latching system includes a keeper and a mounting. The keeper is configured to couple to the first end of the gripping arm of the latch. The mounting secures the anchor to the first cowl.

It is contemplated that the latching system also includes a shaft which secures the keeper of the anchor to the mounting of the anchor. A distance between the keeper of the anchor and the mounting of the anchor in a direction along an axis of the shaft may be selectively adjustable.

It is further contemplated that an adjustment mechanism for adjusting a distance between the keeper of the anchor and the mounting of the anchor in a direction along an axis of the shaft is provided. The adjustment mechanism may include an aperture with a threaded outer surface In one or more embodiments, the anchor of the latching system includes a first notched portion and a second notched portion. The first notched portion of the anchor is configured to couple to the first end of the gripping arm of the latch when the handle is being moved to the closed position to transmit a closing force from the gripping arm to the anchor in a closing direction. The second notched portion of the anchor is configured to couple to the first end of the gripping arm of the latch only when the handle is being moved to the open position to transmit an opening force from the gripping arm to the anchor in an opening direction, oppositely orientated from the closing One or more of the disclosed embodiments provides a device wherein the latching system cannot fully close unless the gripping arm and the anchor are coupled together. Thus, if the two are uncoupled, the handle will remain in at least a partially open position, making it easier to visually determine if the latching system is indeed properly closed—and thus if the cowl doors are secured together and fully closed.

Furthermore, one or more of the embodiments of the present invention provides a latching system that ensures application of a nominal clamping stress between the two cowl doors. If the appropriate force is not present because the latching system is not properly secured, the latching system cannot be fully closed. Such a latching system further increases the ability to visually determine the status of the latching system as well as the two cowl doors.

Additionally, one or more of the disclosed embodiments provides a device with an actuating member that locks the handle in the closed position. This is believed to be beneficial and desirable because it ensures that the cowl doors are properly closed and locked under a nominal stress of clamping during the phases of flight and that the handle will not open and the latch will not decouple from the anchor until the actuating member is released.

Finally, one or more of the disclosed embodiments provides a latching system with an anchor having two portions configured to couple to the gripping arm. It is believed that such a design, along with a movement of the handle and pivot arms, better facilitates separation of the two cowl doors and allows for easier opening and closing of the cowl doors for light maintenance operations without the use of inappropriate tools that may damage the cowl doors or other systems and related components.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claim.

What is claimed is:

1. A high visibility hook latch comprising:
   a hook latch system that can be installed on an aircraft, the system comprising:
   a hook arm (2) having a proximal end and an opposed distal end, the hook arm defining a main hook member at the proximal end configured to engage a mating clevis;
   a handle (4) pivotably attached to the proximal end of the hook arm (2); and
   a connector (3) having a first connector end pivotably attached to the distal end of the hook arm (2) via a link (1), and a second connector end pivotably attached to the handle (4) proximate to where the hook arm (2) is attached to the handle (4);
   the link (1) having a first end attachment point (23), a mid-point pivot axis point (24) pivotably attached to the distal end of the hook arm (2), and a far axis pivot point (25) pivotably attached to the first connector end of the connector (3);
   wherein the handle (4) is configured to pivot around the hook arm (2);
   wherein the connector (3) is configured to drive a rotational movement of the link (I);
   wherein the link (1) is configured to provide a maximum reach of the latch (20);
   wherein the latch (20) is operable between an open position and a closed position; and
   wherein the latch (20) can be visually determined to be open or closed.

2. The high visibility hook latch of claim 1, wherein the link (1) is a substantially rounded L-shaped component with rounded corners.

3. The high visibility hook latch of claim 2, wherein the hook arm (2) further comprises an anchor configured to engage a mating clevis.

4. The high visibility hook latch of claim 3, wherein the anchor is a main hook (21) configured to engage said mating clevis.

5. The high visibility hook latch of claim 2, wherein the latch (20) is configured to form a gap (18) between the handle (4) and the connector (3), wherein the gap (18) indicates when the latch (20) is in the open position and not in the closed position.

6. The high visibility hook latch of claim 3, wherein the latch (20) further comprises a fastener means, wherein the fastener means prevents the latch (20) being operated by means of the handle (4) in the closed position.

7. The high visibility hook latch of claim 6, wherein fastener means is a safety device (16), the safety device (16) comprising a safety hook (5) extending from the handle (4), the safety hook (5) configured to engage a rod (15) extending from the hook arm (2) when the latch (20) is in a closed position.

8. The high visibility hook latch of claim 7, wherein the safety device is operable via a safety device biasing element.

9. The high visibility hook latch of claim 8, wherein the safety device biasing element is a trigger spring (10), and wherein the safety device (16) is spring closed and the safety hook (5) is engaged with the rod (15) via the trigger spring (10).

10. The high visibility hook latch of claim 5, further comprising an adjustment means, and wherein when a safety hook (5) is disengaged from a rod (15), the latch (20) opens via a connector biasing element and the gap (18) is created, allowing the latch (20) to be configured into the open position from the closed position by means of the handle (4).

11. The high visibility hook latch of claim 10, wherein the connector biasing element is a connector spring (14).

12. The high visibility hook latch of claim 10, wherein the adjustment means further comprises the second connector end having a pin assembly (11) and a pin assembly receiving region.

13. The high visibility hook latch of claim 12, wherein an aperture of the pin assembly receiver region is greater than a diameter of the pin assembly, thereby allowing movement of the pin assembly (11) within the pin assembly receiver region.

14. The high visibility hook latch of claim 12, wherein an aperture of the pin assembly receiver region is greater than a diameter of the pin assembly (11).

15. The high visibility hook latch of claim 12, wherein the pin assembly receiver region is a slot (17) on the handle (4), the slot (17) comprising a predetermined length, wherein when the safety hook (5) is disengaged from the rod (15), the latch (20) opens, the pin assembly (11) slides along the predetermined length of the slot (17), and the gap (18) is created, allowing the latch (20) to be configured into the open position by means of the handle (4).

16. A high visibility hook latch, the latch comprising:
   a hook latch system that can be installed on aircraft, the system comprising:

a hook arm (2) having a proximal end and an opposed distal end, the hook arm defining a main hook member at the proximal end configured to engage a mating clevis;

a handle (4) pivotably attached to the proximal end of the hook arm (2), wherein the handle is configured to pivot around the hook arm;

a connector (3) having a first connector end pivotably attached to the distal end of the hook arm (2) via a link (1) and a second connector end pivotably attached to the handle (4) proximate to where the hook arm (2) is attached to the handle (4), wherein the connector is configured to drive a rotational movement of the link;

the link (1) having a first end attachment point (23), a mid-point pivot axis point (24) pivotably attached to the distal end of the hook arm (2), and a far axis pivot point (25) pivotably attached to the first connector end of the connector (3), wherein the link is configured to provide a maximum reach of the latch;

a safety device (16), wherein the safety device (16) comprises:

a safety hook (5) extending from the handle (4) configured to engage a rod (15) extending from the hook arm (2) when the latch (20) is in a closed position, wherein the safety device (16) is spring closed and the safety hook (5) is engaged with the rod (15) via a trigger spring (10), and wherein the safety device (16) prevents the latch (20) being operated by means of the handle (4) in the closed position; and a gap (18) between the handle (4) and the hook arm (2), wherein the gap (18) configures the latch (20) into an open position from the closed position, wherein the adjustment means comprises:

a pin assembly (11); and a slot (17) on the handle (4), the slot (17) comprising a predetermined length, wherein when the safety hook (5) is disengaged from the rod (15), the latch (20) springs open via a connector spring (14), the pin assembly (11) slides along the predetermined length of the slot (17), and the gap (18) is created, allowing the latch (20) to be configured into the open position by means of the handle (4)

wherein the latch can be visually determined to be open or closed.

17. An assembly, the assembly comprising:
a base (31);
a door (32); and
a high visibility hook latch (20) that can be installed on aircraft for holding the door in a closed position relative to the base, the latch comprising:

a hook arm (2) having a proximal end and an opposed distal end, the hook arm defining a main hook member at the proximal end configured to engage a mating clevis;

a handle (4) pivotably attached to the proximal end of the hook arm (2); and a connector (3) having a first connector end pivotably attached to the distal end of the hook arm (2) via a link (1) and a second connector end pivotably attached to the handle (4) proximate to where the hook arm (2) is attached to the handle (4);

the link (1) having a first end attachment point (23), a mid-point pivot axis point (24) pivotably attached to the distal end of the hook arm (2), and a far axis pivot point (25) pivotably attached to the first connector end of the connector (3);

wherein the handle (4) is configured to pivot around the hook arm (2);

wherein the connector (3) is configured to drive a rotational movement of the link (1);

wherein the link (1) is configured to provide a maximum reach of the latch (20);

wherein the latch (20) is operable between an open position and a closed position; and wherein the latch (20) can be visually determined to be open or closed.

18. The assembly of claim 17, wherein the latch (20) further comprises:

a safety device (16), wherein the safety device (16) comprises a safety hook (5) extending from the handle (4) configured to engage a rod (15) extending from the hook arm (2) when the latch (20) is in a closed position, wherein the safety device (16) is spring closed and the safety hook (5) is engaged with the rod (15) via a trigger spring (10), and wherein the safety device (16) is suitable for preventing the latch (20) being operated by means of the handle (4) in the closed position; and a gap (18) between the handle (4) and the hook arm (2), wherein the gap (18) is suitable for configuring the latch (20) into the open position from the closed position, wherein the adjustment means comprises:

the safety device (16);

a pin assembly (11); and a slot (17) on the handle (4), the slot (17) comprising a predetermined length, wherein when the safety hook (5) is disengaged from the rod (15), the latch (20) springs open via a connector spring (14), the pin assembly (11) slides along the predetermined length of the slot (17), and the gap (18) is created, allowing the latch (20) to be configured into the open position by means of the handle (4).

* * * * *